Aug. 14, 1956 — O. JENSEN — 2,759,128
REACTORS
Filed July 31, 1952 — 7 Sheets-Sheet 1

INVENTOR.
OTTO JENSEN
BY
Ostrolenk & Faber
ATTORNEYS

Aug. 14, 1956  O. JENSEN  2,759,128
REACTORS
Filed July 31, 1952  7 Sheets-Sheet 2

INVENTOR.
OTTO JENSEN
BY
ATTORNEYS

Aug. 14, 1956  O. JENSEN  2,759,128
REACTORS
Filed July 31, 1952  7 Sheets-Sheet 3

INVENTOR.
OTTO JENSEN

ATTORNEYS

United States Patent Office 2,759,128
Patented Aug. 14, 1956

2,759,128

REACTORS

Otto Jensen, Malvern, Pa., assignor to I-T-E Circuit Breaker Company, Philadelphia, Pa., a corporation of Pennsylvania Application July 31, 1952, Serial No. 301,880

4 Claims. (Cl. 317—100)

My invention relates to mechanical rectifiers or converters of the type described in copending application Serial No. 212,017 filed February 21, 1951, now Patent No. 2,693,569, to Edward John Diebold and assigned to the assignee of the instant application and is more particularly related to improvement of the commutating reactor and novel combination casing for the commutating reactor and transformer.

A mechanical rectifier produces direct voltage by making metallic contact between a proper phase of an A. C. system and the associated D. C. system during the time interval the particular phase of the A. C. system is capable of delivering energy in the desired direction and breaking the metallic contact when the A. C. phase reverses its voltage in relationship to the D. C. voltage. This operation is performed sequentially and repeatedly in synchronism with the A. C. frequency.

The metallic contacts which perform the switching are switches which are able to carry the full current which flows through the rectifier. These contacts, when open, are able to withstand the full inverse voltage, when the alternate voltage is opposed to the direct voltage. But they cannot interrupt a current greater than a fraction of one ampere without suffering a slight damage. Due to the periodical operation of the switches (they must each operate 60 times per second in a 60 cycle system), the slight damage to the contact, if they are called upon to interrupt any substantial current soon accumulates to a total destruction of the contact surface.

Another limitation is the inrush current after closing the contact. A contact does not close instantly. During closing the contacts touch very lightly over a small area thus providing a high resistance. As the contacting area and pressure increases, the contact resistance is correspondingly reduced. The time required for this phenomenon is twenty to thirty microseconds. If a high current is permitted during this interval, the narrow contact area will melt and thus be the cause of transfer of metal. Furthermore, the contact might rebound partially or totally after approximately one hundred microseconds. If the reverse motion is strong enough to reduce the contact pressure appreciably, some more transfer of metal will ensue. The transfer of metal will again be the cause of destruction because it is cumulative. To use such a switch as a mechanical rectifier, without any additional protective equipment will immediately result in its destruction.

To prevent such damage, saturable commutating reactors are inserted in series with the contacts. These reactors have a substantially square shaped, so-called hysteresis loop which present high resistance at low current and thus limit the inrush current after closing, and the residual current before opening, to a sufficiently low value to warrant a satisfactory performance for many billion operations.

The rectifier contacts are arranged to open during the interval just after the current passes through zero. At this time, the hysteresis loop is very steep, the rate of change of flux very large and accordingly the reactance of the saturable reactor very large compared to a normal load. The amplitude of the current flowing in the system instead of changing in accordance with the normal sinewave is, therefore, held at a comparatively low value during the switching interval.

The main winding of the commutating reactor must be designed to carry the full load current of the mechanical rectifier. Thus in commercial applications these windings must have sufficient cross-sectional area to carry rectified load currents of the magnitude of 5,000 and 10,000 amperes. These windings are wrapped around a cylindrical core of Permeron. The permeron core material having a composition of 40 to 50% Ni, has a flux-charge characteristic which closely approaches those of an ideal magnetic material and thus has a high impedance while flux-charge is taking place and negligible impedance when the core is saturated. The effect is to restrain current (step length) flow while the magnetization is making a complete reversal in either direction and to permit full current flow the instant the core is saturated. The main winding is wound on this hollow cylindrical core parallel to the axis thereof with each completed turn of the conductor on the outside and inside surface of the hollow cylinder.

However, if a uniform gage conductor is used for the windings the inside smaller circumference of the hollow cylindrical core would have to accommodate the same quantity of large cross-sectional conductors as the larger outside circumference and would therefore necessitate a large cumbersome cylindrical core. In practice it has been found that the large core which would thus be required would be uneconomical, a waste of space, impractical from the point of view of manufacture and installation; and furthermore could not be practically assembled in a common casing with the transformer as will hereinafter be more fully explained.

Furthermore, the large core required by conductors of uniform cross-section has one basic magnetic disadvantage. Namely, the mean length of the magnetic path in the permeron core material would be too high resulting in an excessive magnetizing current which in turn would result in an excessive contact current. However, with my present invention, reduction of mean length of magnetic path is of the order of 50%.

My invention relates to a novel and inventive structural arrangement to overcome the above enumerated disadvantages which result from the necessity of using a large cylindrical core in order to provide sufficient space requirements on the inside circumference for conductors of uniform cross-sectional area.

With the structural arrangement of my invention conductor windings with sufficiently large cross-sectional area to carry the load current and dissipate the heat generated can be used with a relatively small and compact hollow cylindrical core. This is accomplished by providing a commutating reactor in which the conductors on the outside circumference have the proper cross-sectional area and the conductors in the smaller inside circumference have a reduced or graduated gage or cross-sectional area with respect to those on the outside circumference.

That is, a conductor of a stepped or graduated gage is utilized so that the smaller conductor appears on the inside area of the cylindrical core where the available seating area is considerably less than the outside area.

It will be noted that due to the reduced cross-sectional area of the conductors in the internal position of the core, there will be an excess generation of heat due to the increased resistance and furthermore the heat dissipating ability of these crowded conductors will be relatively low by means of convection and radiation. On the other hand the spaced conductors located on the outside surface of the core will have large heat dissipating ability by way of convection and radiation although relatively little heat will be generated in these coils due to their large cross-sectional area.

Although this may appear to be a disadvantage it has been found to be a beneficial arrangement for the purpose of dissipating excess heat. That is, the high heat conductivity of copper and the large temperature differential between the conductors on the inside and outside will permit the heat to flow by means of conduction from the inside conductors to the outside conductors. Once the heat has reached the outside conductors, it is easily and rapidly dissipated by radiation and convection due to the relatively large exposed surfaces of these conductors. Hence, conductors of reduced cross-sectional area can be used in the smaller internal portion of the core and by virtue of the high heat conductivity of copper and the temperature gradient conduct the excess heat generated therein to the outside conductors and there rapidly dissipate it into the surrounding medium of oil by means of radiation and convection.

In addition to providing above mentioned method of dissipating excess heat, further means are provided to substantially reduce the heat which will be generated by the main winding of the transformer.

The required large cross-sectional area of the outside conductors to carry the full load current would result in high eddy current losses and a large band of conductors which would have to be positioned adjacent radial sides of the adjoining conductor turns and thereby substantially reduce the heat dissipating ability of the conductor by means of convection and radiation. Hence, I have found it desirable to provide four parallel windings to replace the one main winding to thereby reduce the required cross-sectional area by a factor greater than four and thus provide a relatively large distance between the adjacent radial surfaces of the conductor winding dissipating ability. By this arrangement, more economical windings can be used, assembly and manufacturing problems are reduced by providing a smaller conductor to be wound and the heat dissipating ability is materially increased.

Accordingly, an object of my invention is to provide a novel winding arrangement for a commutating reactor having a relatively small and compact cylindrical core.

Another object of my invention is to provide a novel commutating reactor for mechanical converters which has graduated gage conductors.

Still another object of my invention is to provide a commutating reactor for a mechanical rectifier with a main winding structural arrangement which permits the use of a small cylindrical core so that the reactor and associated transformer can be housed in a common casing.

A further object of my invention is to provide a commutating reactor having a graduated conductor winding with the heat generated in the smaller internal conductors conducted to the larger outside conductor through the copper conductor of high conductivity and there rapidly dissipated.

Another object of my invention is to provide a novel commutating reactor having a graduated conductor with the main winding comprising four parallel windings.

Still another object of my invention is to provide a commutating reactor with parallel windings which is economical, easily assembled and manufactured due to the small cross-sectional area of the conductors and has high heat dissipating ability.

Another object of my invention is to provide a novel commutating reactor for a mechanical converter which is economical, small and compact, practical from the point of view of manufacture and installation and can be installed in a common casing with its associated transformers.

Another object of my invention is to provide a novel commutating reactor in which the internal windings are of a smaller cross-sectional area than the outside windings.

A further object of my invention is to provide a commutating reactor with graduated gage conductors arranged to permit a small amount and size of permeron core to be used.

A still further object of my invention is to provide a mechanical converter commutating reactor with a small internal diameter core in relation to the required gage conductors in which heat is rapidly and easily dissipated.

Mechanical converters require power transformers to provide the proper secondary voltage for D. C. utilization. The circuit from the transformer secondaries are connected in series with the main windings of commutating reactors. Heretofore a separate and independent tank unit was provided to house the power transformers with the commutating reactors positioned outside the tank.

With this prior art arrangement the commutating reactors were mounted inside the building and were provided with an enclosure on top of which was mounted a fan which forced air in through the bottom of the stack of reactors and out the top. However, a considerable amount of dirt was blown into the reactor windings. Due to this undesirable condition, it was considered desirable to treat the commutating reactor in the same manner as a transformer to obtain better and cleaner cooling by providing the reactor with a tank arrangement similar to that used for the power transformer.

However, this arrangement has many of the disadvantages encountered in previous arrangement plus other disadvantages. For example, when the reactor is mounted in a separate tank the plurality of connections between the power transformer secondaries and the reactor main windings must be made through external bushings and leads. Thus, this arrangement increases the number of bushings required and also takes up considerably more space. Furthermore, this arrangement still has the disadvantage of requiring two separate and independent cooling systems, one for the transformer and another for the reactor. Also the length of the bus lines between the two components of the separately mounted transformer and reactor resulted in insertion of from 3 to 3½ % reactance in the circuit resulting in the deterioration of the contacts.

With the arrangement of my invention all of the above disadvantages are overcome. With my novel arrangement of providing a unitary housing or tank for the commutating reactors and the power transformers, it is possible to obtain (1) Shorter length of bus leads between the transformer secondaries and the main winding of the reactors to thereby reduce the reactance to less than one half of one per cent and thereby prevent deterioration of the contacts;

(2) A single cooling system to cool both the transformer and commutating reactors to thereby eliminate the necessity of an extra cooling unit;

(3) Material reduction in the number of tank bushings required since all the connections between the transformer secondaries and the main winding of the commuting reactors can be made within the unitary tank for the combination of the two circuit units;

(4) Economy by requiring a single large tank for the combination rather than separate independent tanks;

(5) Considerable saving in space;

(6) Better and cleaner cooling of the reactor and prevents dirt from being blown into the windings.

Two embodiments of my novel arrangement are set forth in the appending disclosure. In the first embodiment the commutating reactor stacks are mounted on the side of power supply transformers and hence are cooled by oil which has not passed through the transformer means. In the second embodiment the individual commutating reactors are mounted on top of their respective power supply transformer. Although this latter embodiment has the disadvantage of having the reactors cooled by the oil which has passed through the transformer, it has the added advantage of providing a more compact unit with shorter lead length between the transformers and reactors.

Accordingly, an object of my invention is to provide a unitary tank to house the combination of power transformers and commutating reactors.

Another object of my invention is to provide a novel structural arrangement for a mechanical converter which introduces less than one half of one per cent reactance into the circuit.

Another object of my invention is to provide a combination transformer and commutating reactor housing which requires a single cooling system.

Still another object of my invention is to provide a mechanical converter with a novel combination arrangement for the transformers and reactors which will prevent deterioration to the switching contact.

Another object of my invention is to provide a novel arrangement for a mechanical converter which will substantially reduce the required number of bushings required for the connection between the transformers and reactors.

A further object of my invention is to provide a novel combination tank for transformer and reactor which results in economy and saving of space.

A further object of my invention is to provide a novel combination transformer and commutating reactor unit with the latter unit aligned on the side of the former.

A further object of my invention is to provide a novel combination arrangement for a transformer and commutating reactor with the reactor of each phase mounted on top of its respective transformer.

These and other objects of my invention will be apparent from the following description when taken in connection with the drawings in which.

Figures 1, 2:
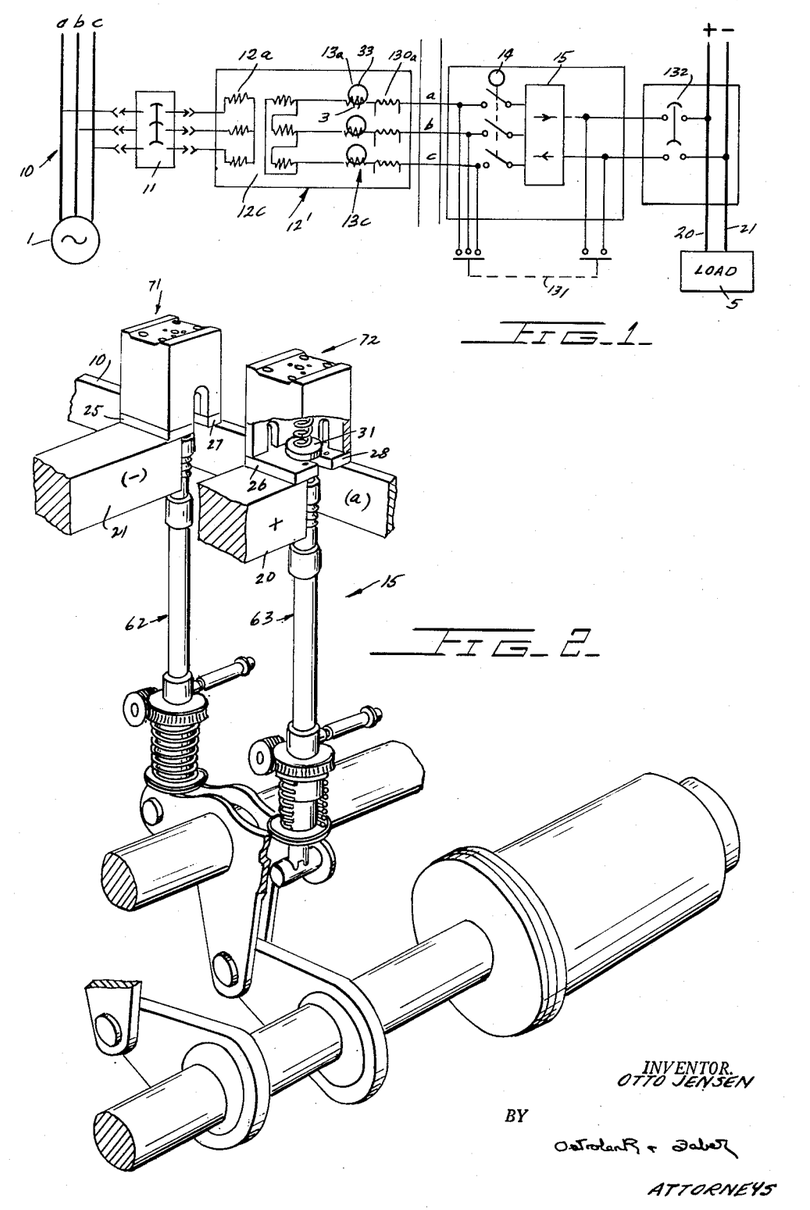
Figure 1 is a schematic electrical connection diagram of the mechanical converter to which my invention applies.
Figure 2 is a perspective view of the push rod assembly and contact assembly of the contact converter for the mechanical converter.
Figure 11:
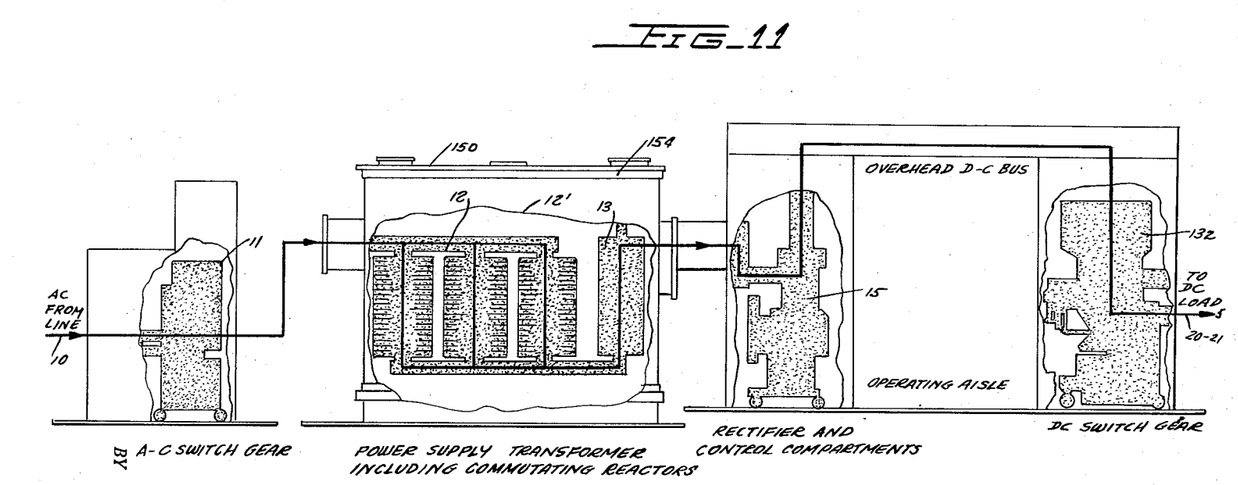
Figure 11 is a cross-sectional schematic view of my novel combination transformer and commutating reactor unit in connection with the entire rectification circuit.

Figures 1 and 11 illustrate the schematic diagram showing the circuitry between the source 1 of alternating current and the direct current load 5.

The source of alternating current is taken from the alternating current lines 10 through the circuit breaker 11 to step down transformer 12. The source current is then passed through the commutating reactors 13 to "step" the current for switching purposes as set forth in application Serial No. 212,017 filed February 21, 1951.

Current transformer 130a, b, c are connected in series with the A. C. line and operate the short circuiter 131 on the occurrence of a fault circuit. This protective arrangement insures protection of the contact assembly 15 during excessive current flow.

Figures 5, 6A, 7:
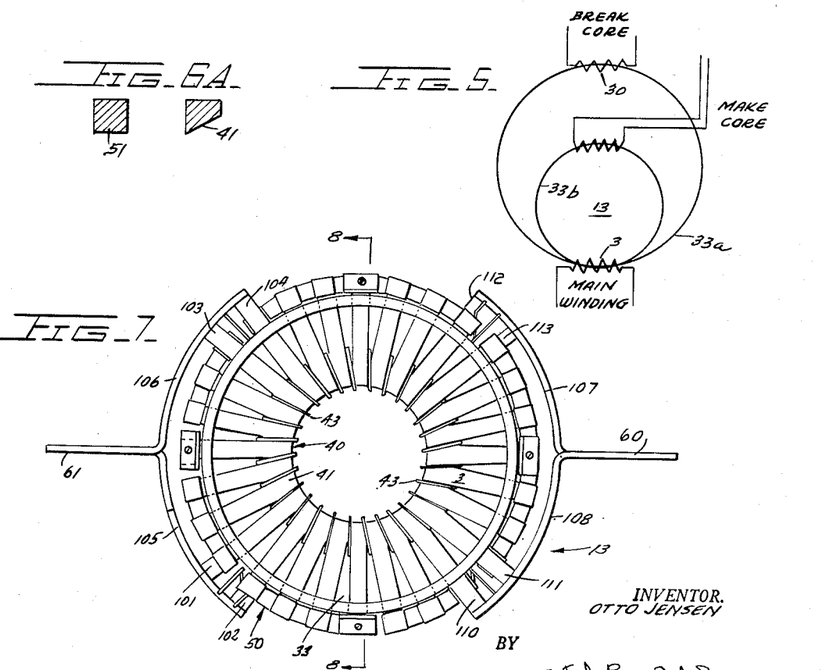
Figure 5 is a schematic electrical diagram of the commutating reactor of my invention.
Figure 6a is a cross-sectional view of the inside and outside conductors of my invention.
Figure 7 is a top view, taken along the line 7—7 of Figure 6, showing the reduced cross-sectional area of the internal conductors of my novel commutating reactor.
Figure 6:
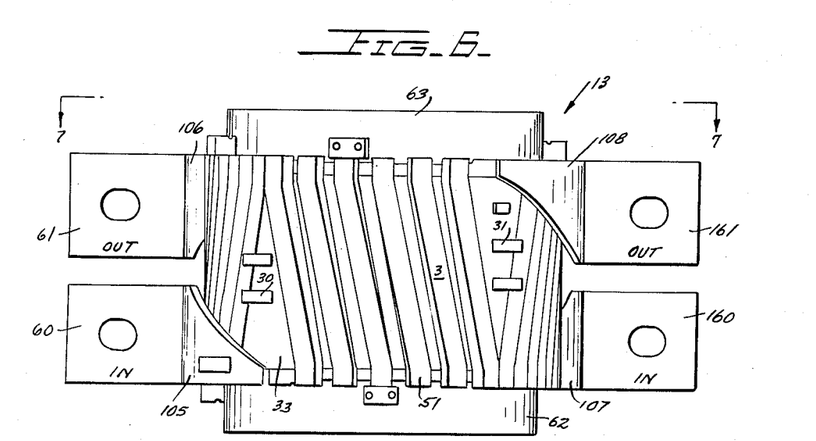
Figure 6 is a side view of a section of my novel commutating reactor.
Figure 9:
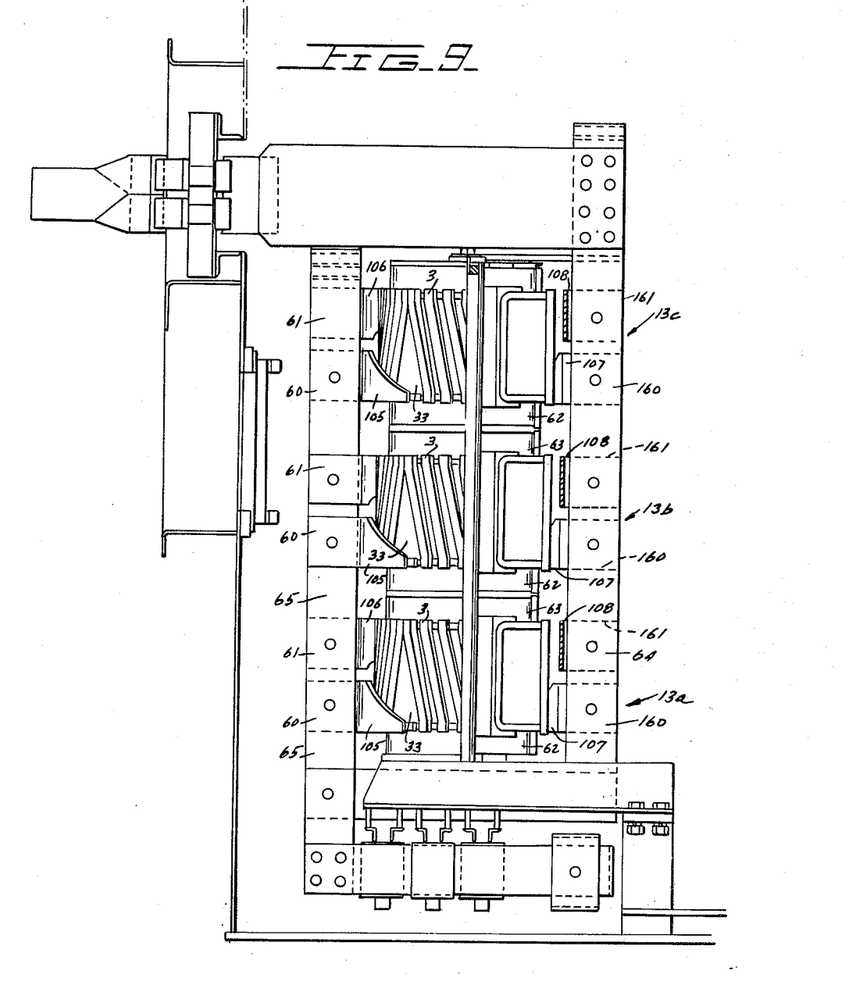
Figure 9 is a side view of a stack of section reactors shown in Figure 7.
Figure 10:
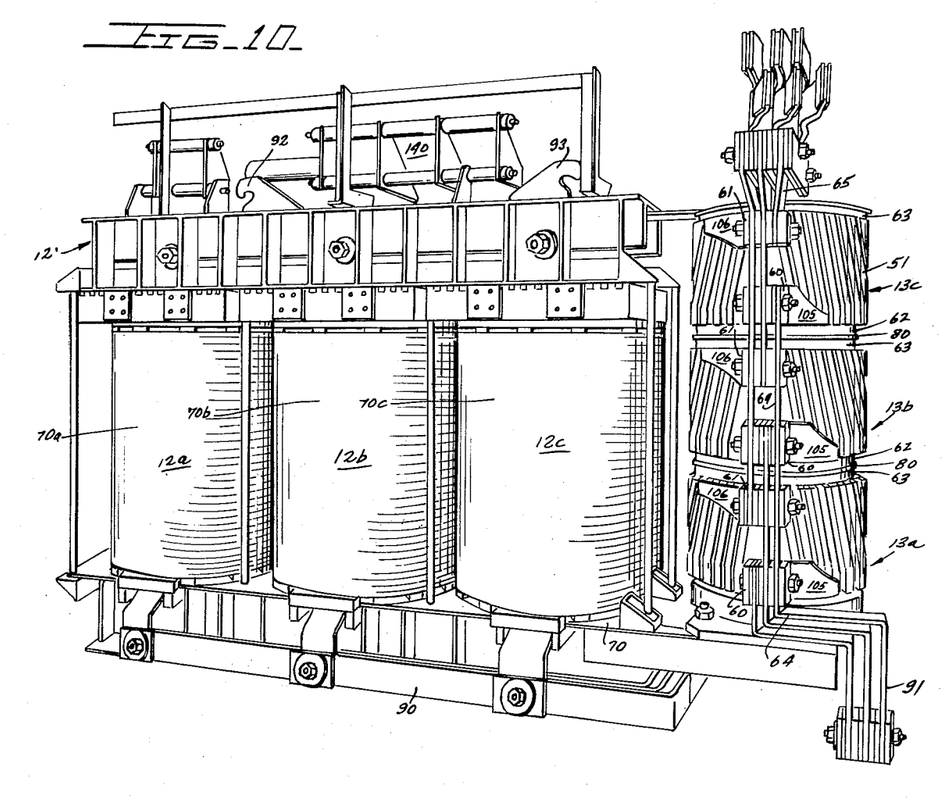
Figure 10 is a perspective view of the mounting and arrangement for a unitary tank for the combination transformers and commutating reactors.

The enclosure means 12' is shown in detail in Figure 10 and the construction of commutating reactor 13 in Figures 6, 7 and 9.

The current passes through disconnect switches 14 to the contactor converter 15. The contact converter 15 sequentially and repeatedly in synchronism with the A. C. frequency connects the alternating current source buses 10a, b, c to the D. C. load buses 20—21 and load 5 through the D. C. protective equipment 132.

The contact converter 15 is bridge connected to permit better use of the power transformer 12 by doubling the phase operation of the connector and thereby result in smoother D. C. current and less interference with commutation facilities, as best seen in Figure 2.

The bridge connected contact converter 15 has two sets of contacts, a negative set 25—30—27 (a—) and a positive set 26—31—28 (a+). The two sets of contacts are offset 180° electrical degrees from each other and the contacts in either positive or negative set for all the phases a, b and c are set 120° apart. The circuit may be supplied with three phase voltage a, b, c and at one period of time the load current will flow from phase a through contact a+ through the load and back over a contact c— to c. During positive commutation between phases a and b, the load current divides between these two phases by closed contacts a+ and b+.

For the purpose of simplification, I have shown in Figure 2 the switching structure which is used at phase a, it being understood that the switch apparatus for phases b and c are identical in construction.

The details of the contact assembly units 71, 72 are described in my copending application Serial No. 307,067, filed August 29, 1952, and the details of the push rod assembly 62 and 63 are described in copending application Serial No. 307,024, filed August 29, 1952.

Energy from the generator 1 is fed through the power transformers 11 to the main winding 3 of the commutating reactor 13 and to the load 5 by means of closed contacts in the contact converter 15. The commutating reactor 13 consists of a coil 3 of conducting material and a core 33 which is saturable at relatively low current values.

Figures 3, 4:
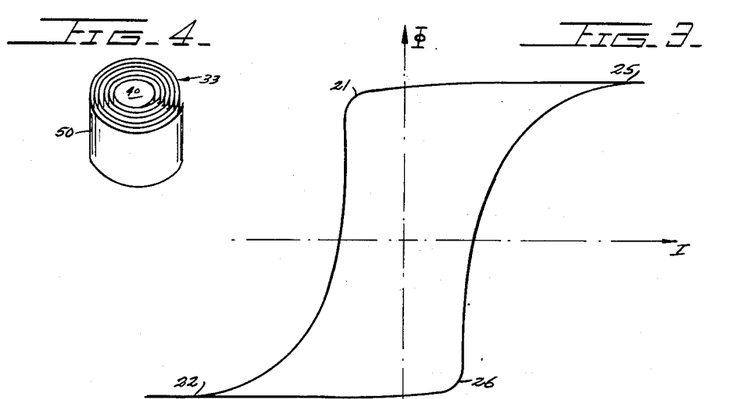
Figure 3 is a hysteresis loop for the commutating reactor of my invention.
Figure 4 is a view in perspective of the hollow cylindrical core of my invention.

The core is made of wound tape, as seen in Figure 4, and therefore has no air gap. By reason of the use of a tape, the magnetic flux flows in the circumferential direction of the wound tape. Accordingly, the flux does not cross any air gaps. In order to reduce eddy currents, the tape is made extremely thin, being usually of the order of from 0.001 to 0.002 inch thick.

The coil around the core should be wound as tightly as possible. This permits the use of a small core for a predetermined amount of wire that must be used; it also reduces the reactance of the core when the core is saturated and the coil assumes the properties of an air reactor of the same dimensions.

The best core material for commutating reactors known up to now is vacuum fused 50% iron, 50% nickel alloy, and must not contain any impurities such as oxygen, carbon, other metals etc. In order to maintain its crystallinic structure, it should not be deformed after annealing. Insulation such as magnesium oxide is provided between the layers of the tape of the property to withstand the annealing temperatures. The tape is cold rolled down to the final thickness and annealed at 1950° F. in electrolytic hydrogen with no water vapors present.

The outstanding property of a commutatory reactor is the great variation in physical behavior it affords at different currents. Whenever the total ampere-turns around the reactor core are higher than a predetermined minimum, the reactor behaves exactly as if it were a copper coil wound around a non-magnetic core. It has a predetermined resistance and reactance of relatively low value.

As soon as the total ampere-turns are reduced to near zero and changed into the opposite direction, the reactor suddenly assumes a reactance which is 50,000 or 100,000 times higher than at the larger currents. This transition happens always at the same current value and is instantaneous.

A high voltage must now be applied to the winding of the coil which carries only a very small current, i. e., the so-called magnetizing current. This current is almost constant and is almost independent of the voltage applied. This period of high reactance lasts for a relatively short time interval in each cycle with the exactly defined condition that the voltage applied to the coil, times this time interval is always constant. After the end of the time interval, the coil has again the properties of an air core reactor, the core reactance becomes negligibly small and the current suddenly rises again to a value which is limited only by external means, such as a load.

The proportion of the abnormal behavior of the commutating reactor is usually described by its flux-current curve shown in Figure 3, inappropriately called hysteresis loop. This curve (Figure 3) resembles a rectangle with the horizontal parts (extending to the infinite) indicating the normal low reactance behavior and the almost vertical parts indicating the high reactance part.

This latter portion is characterized by the low current which cannot be allowed to increase during the above mentioned time interval. This current is called magnetizing current, or step current, and the time interval the step length, i. e., the time during which the current is actually frozen, to the small value of the step current. The step current of practically used commutating reactors is less than one thousandth of the peak current, the step length approximately one one-thousandth second and the rise of the flux after the end of the step is less than 4% of the step length.

From the above, it will now be clear that during most of the current cycle, as for example, current values from 25 (Figure 3) and higher, the reactor is saturated. Accordingly, as shown, there is no flux change and the reactor presents substantially no impedance to the circuit. Accordingly, during this portion of the cycle, all or almost all of the voltage of the generator 1 appears across the load 5.

However, during a relative small part of the cycle when the current has just passed through zero value reversing its polarity from positive to negative as at 21 (Figure 3) and is increasing to 22, commutating reactor 13 is saturated. At this low current value, due to rapid change in flux from 21 to 22 (Figure 3) the reactor 13 presents a very much higher reactance than the load. Due to this high impedance, the current is held low and all or substantially all the voltage of the generator appears across the reactor.

During this portion of the cycle, the current is very small. The rectifier switch opens and must interrupt this small current.

Figures 7A, 8:
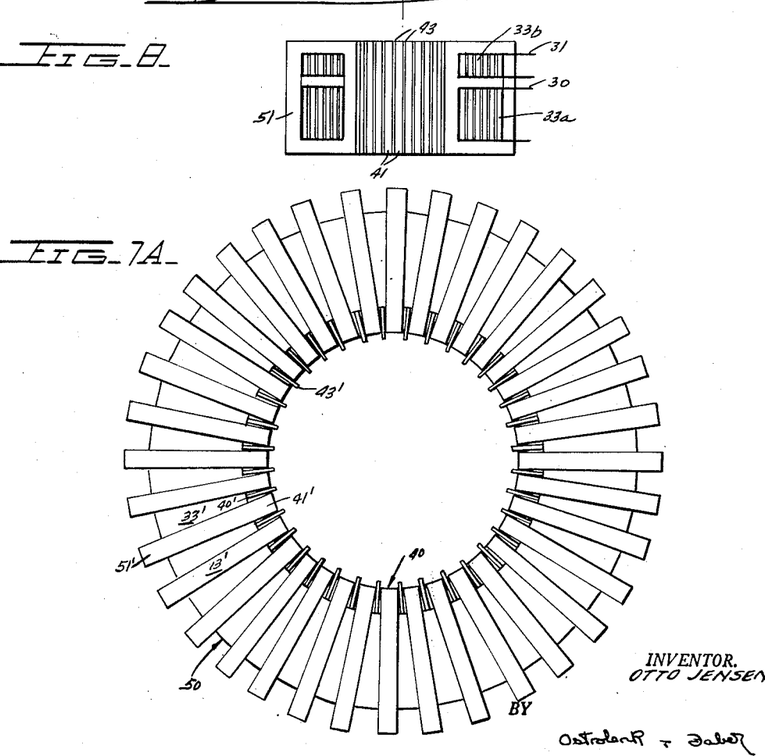
Figure 7a is a top view similar to Figure 7 showing the required size of the core for non-graduated conductors.
Figure 8 is a view along the line 8—8 of Figure 7 showing a cross-section of the commutating reactor.

The commutating reactor 13 of my invention is seen in Figures 4, 5, 6, 7, 9 and 10. The commutating reactor 13 is made of two hollow cylindrical cores 33a and 33b as best seen in Figure 8. These cores 33a and 33b are made of permeron which is described on pages 1062–1065 of AIEE Transactions, volume 70, 1951. Each of the cores 33a and 33b referred to as 33 is a hollow cylindrical form as best seen in Figure 4. The commutating reactor 13 has three sets of windings, a main winding 3, a break winding 30 and a make winding 31. The break winding 30 is wound around the large bottom core 33a and the make winding 31 is wound around the small top core 33b as best seen in Figure 8. The main winding 3 is wound around both the cores 33a and 33b, hereinafter referred to as core 33, parallel to the longitudinal axis thereof. My invention is related to the novel structural arrangement for the main winding 3.

As best seen in Figures 6 and 7, the main winding 3 is composed of a plurality of conductors 41 and 51. The conductors 51, of approximately ¾" in width, are positioned on the outside circumference 50 of the hollow core 33 and the conductors 41 are positioned on the inside circumference 40 of the hollow cylindrical core 33. The conductors 51 have the proper cross-sectional to carry the full load current without overheating or introducing excessive resistance.

If the winding 3 were of the uniform cross-section of conductors 51, a relatively large core would have to be used in order to accommodate the sum total length of the conductor diameter on the small inside circumference 40 of the core 33. Figure 7a, with the same numerals of Figure 7 used, illustrates the prior art arrangement of the commutating reactor; Figure 7a illustrates the size of core 33' that would have to be used if the main winding 13' were of uniform cross-sectional of the conductor 51'. With this arrangement it was necessary to provide a large inside circumference 40' in order to properly accommodate the sum total length of all diameters of the conductors 41' that are to be placed on this inside circumference.

This resulting large core results in an uneconomical construction, a waste of space and has been found to be impractical for both manufacturing and installation. With the structural arrangement of my invention, parallel windings and a graduated cross-sectional conductor is used so that the conductors 41 on the inside circumference have a smaller cross-sectional area than the conductors 51 on the outside circumference 50. With this arrangement it is no longer necessary to have the large inside circumference 40' of the core 33' and hence a relatively small cylindrical core 33 (Figures 6, 7 and 8) with a reduced inside 40 and outside 50 circumference can be used resulting in a considerable saving of core material and space.

Thus, as best seen in Figures 6a and 7 the conductors 41 which form the portion of main winding 3 located on the inside circumference 40 of the core 33 are cut at a bias so that the resulting conductor has a gage or cross-sectional area which is considerably less than the gage or cross-sectional area of the conductors 51 positioned on the outside circumference 50 of the hollow cylindrical core 33.

As best seen in Figure 7, these inside conductors 41 can now be positioned on a circumference 40 which would be insufficient to accommodate the sum total length of the widths of conductors 51 or 41' (Figure 7a).

Each of the conductors 41 on the inside circumference 40 of the core 33 are separated by fibre members 43 to increase the leakage distance and insulation therebetween.

As heretofore mentioned, the main winding 13 comprises four parallel windings. By providing four parallel windings the cross-sectional area of the conductors can be reduced by one fourth, excessive eddy currents can be eliminated and a larger exposed conductor surfaces can be obtained to more rapidly dissipate the heat by convection. The circuitry is as follows: terminal connectors 60 and 160 represent input terminals and the terminal connectors 61 and 161 represent the output terminals. The input terminal 60 is connected by bus 105 at 101 and 102 to the winding conductors.

The winding to the left of connection 101 are left hand windings and terminate at 103 where they are connected through bus 106 to output terminal 61.

The winding to the right of connection 102 are right hand windings and terminate at 110 where the current is carried to output terminal 161, by means of bus 108.

In similar manner the input terminal 160 is connected through bus 107 to connectors 112 and 113. The conductors to the left of connection 112 are right hand windings which terminate at 104 and the current is carried to output terminal 61 by means of bus 106. The windings to the right of connection 113 are right hand windings terminating at 111 and the current is carried therefrom by bus 108 to output terminal 161. Hence, the main winding 13 has four parallel windings of seven turns each, between terminals 102—110, 111—113, 112—104, and 103—101.

The reactor 13 is provided with a phenolic base 62—63 which is used for the purposes of support and insulation as will hereinafter be described.

Figure 12:
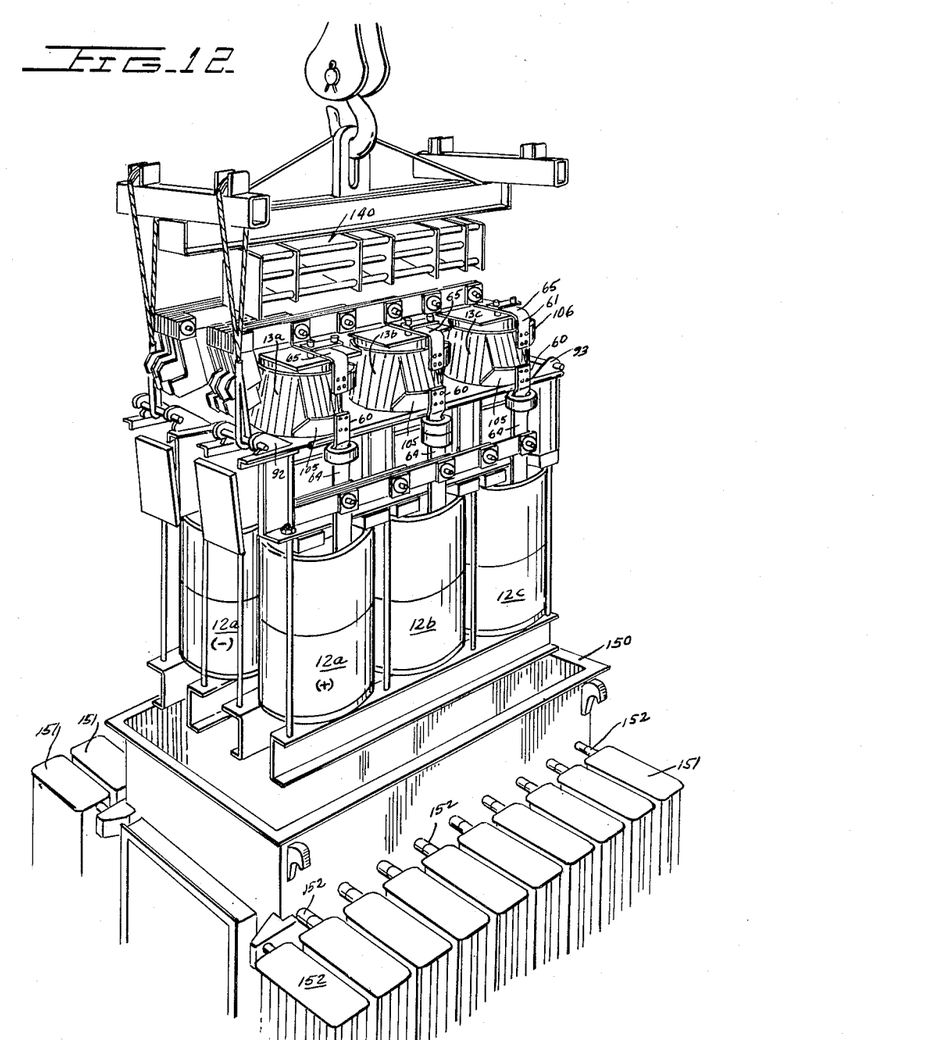
Figure 12 is a perspective view of a second embodiment of my novel combination transformer and commutating reactor showing same being positioned in a unitary tank.

A commutator reactor 13 is used for each phase in a half wave rectification system, as seen in Figure 10, and two such units are used for each phase on a full wave rectification system, as seen in Figure 12.

The tank unit of Figure 10 shows the arrangement of components for a half wave rectification system. Thus, for half wave conversion from a three phase A. C. source, it is necessary to provide the mechanical converter with three commutating reactors (see Figure 1) one for each phase. To achieve a compact arrangement, the reactors 13 of Figures 6 and 7 are placed on top of each other to form a stack of three reactors, as best seen in Figures 9 and 10 and insulated from each other by means of phenolic bases 62—63.

The input terminals 60—160 and 61—161 of the reactors 13 are connected by means of the plurality of vertical input and output bus bars 64 and 65 respectively.

The stack assembly of Figure 9 is supported by means of phenolic bases 62—63 resting on aluminium spiders 80 in turn supported from the center column as seen in Figure 10.

The power supply transformer 12a, b, and c for phases a, b and c of power line 10 are positioned to the left of the commutating reactor stacks 13a, b, c and supported from the common base construction. The primary winding 70a, b, c of the transformers, 12a, b, c are energized from the primary leads (not shown) connected to the unit at the upper left hand corner.

Energy from the secondaries of the transformers 12 is fed to a commutating reactor windings 3 by means of secondary bus bars 90—91. The transformers 12 and reactor 13 are provided with hook means 92—93 for easy removal from the tank as seen in Figure 12.

Another embodiment for a compact arrangement for the commutating reactors 13a, b and c and power supply transformers 12a, b and c is shown in Figure 12. In this embodiment the commutating reactors 13 are positioned on top of the power supply transformers 12.

As can be clearly seen, the leads 90 and 91 from the secondary of transformer 12 to the main windings 3 of the reactor 13 as shown in Figure 10, can be completely eliminated and short bus bars 64 connect the transformer secondaries to the reactors 13.

The transformer 12 is provided with tap changer means 140 positioned above the transformer in the embodiment of Figure 10 and above the reactors 13 in the embodiment of Figure 12.

As best seen in Figure 12, the entire combination of the power supply transformers and commutating reactors are positioned in a tank 150. The tank 150 is provided with a plurality of radiator cooling fins 151 which are connected at their top by tubing 152 to the tank 150 and also at their lower end (not shown). After the combination unit of transformers 12 and reactors 13 are positioned in tank 150 the entire unit is filled with an insulating and cooling oil such as pyranol. The entire unit is then sealed closed by a cover 154 as seen in Figure 11. Hence, as the components within the tank 150 begin to warm up, heat will be transfered to the oil means by convection. As the hot oil has a lower density than the cold oil, it will raise in the tank 150 and pass through openings 152 into the radiator cooling fins 151.

The large exposed surfaces of the radiators 151 will ensure rapid cooling of the oil therein and pass it back into the tank through the lower openings (not shown) which are similar to opening 152. Hence, a single continuous closed oil cooled system is provided as a means to dissipate the heat generated by both the transformers 12 and commutating reactors 13.

In the foregoing, I have described my invention only in connection with preferred special embodiments thereof. Many variations and modifications of the principles of my invention within the scope of the description herein are obvious. Accordingly, I prefer to be bound not by the specific disclosure herein but only by the appending claims.

I claim:

1. A saturable reactor comprising a core and a main winding; said core comprised of a tape of magnetic material wound in the form of a hollow cylinder; said main winding wound on said core in a direction substantially parallel to the axis thereof; said main winding comprising a first and second set of conductors positioned on the inside and outside circumference respectively of said core; said second set of conductors having a cross-sectional area designed to carry full load current without overheating; said first set of conductors being cut at a bias and having a cross-sectional area as a result thereof which is less than the cross-sectional area of said second set of conductors; said first set of conductors dissipating excess heat by conduction to said second set of conductors; and said second set of conductors dissipating heat by convection.

2. A saturable reactor comprising a core and a main winding; said core comprised of a tape of magnetic material wound in the form of a hollow cylinder; said main winding wound on said core in a direction substantially parallel to the axis thereof; said main winding comprised of four windings electrically connected in parallel to reduce the magnitude of eddy current and provide a larger exposed conductor surface to more readily dissipate excess heat by convection; said main winding comprising a first and second set of conductors positioned on the inside and outside circumference respectively of said core; said second set of conductors having a cross-sectional area designed to carry full load current without overheating; said first set of conductors being cut at a bias and having a cross-sectional area as a result thereof which is less than the cross-sectional area of said second set of conductors; and said first set of conductors dissipating excess heat by conduction to said second set of conductors.

3. In a mechanical rectifier for providing unidirectional current from a multi-phase source to a direct current load comprising a plurality of commutating reactors and power supply transformers; each of said power transformers comprising primary and secondary windings; each of said commutating reactors being comprised of a magnetic core and a main winding wound thereon; said core comprised of a tape of magnetic material wound in the form of a hollow cylinder; said main winding wound on said core in a direction substantially parallel to the axis thereof; said main winding comprising a first and second set of conductors positioned on the inside and outside circumference respectively of said core; said second set of conductors having a cross-sectional area designed to carry full load current without overheating; said first set of conductors being cut at a bias and having a cross-sectional area as a result thereof which is less than the cross-sectional area of said second set of conductors; said first set of conductors dissipating excess heat by conduction to said second set of conductors; said second set of conductors disipating heat by convection; said commutating reactors and said power transformers housed within a single tank unit; electrical conductors; said secondary windings of said power transformers electrically connected within said tank to associated main windings of said commutating reactors by said electrical conductors; said electrical conductors being constructed to have a minimum length to thereby decrease reactance; an oil cooling system in said tank unit; said oil cooling system comprising a means to circulate said oil within said single tank unit and a means to extract heat from said oil; said oil being circulated to absorb heat from said commutating reactors and power transformers, said heat absorbed by said oil being dissipated by said means to extract heat.

4. A saturable reactor comprising a core and a main winding; said core comprised of a tape of magnetic material wound in the form of a hollow cylinder; said main winding wound on said core in a direction substantially parallel to the axis thereof; said main winding comprised of a first and second winding electrically connected in parallel to reduce the magnitude of eddy current and provide a larger exposed conductor surface to more readily dissipate excess heat by convection; said main winding comprising a first and second set of conductors positioned on the inside and outside circumference respectively of said core; said second set of conductors having a cross-sectional area designed to carry full load current without overheating; said first set of conductors being cut at a bias and having a cross-sectional area as a result thereof which is less than the cross-sectional area of said second set of conductors; and said first set of conductors dissipating excess heat by conduction to said second set of conductors.

References Cited in the file of this patent

UNITED STATES PATENTS

| | | |
|---|---|---|
| 1,000,440 | Reeves | Aug. 15, 1911 |
| 1,320,040 | Fayer | Oct. 28, 1919 |
| 1,986,884 | Fassler | Jan. 8, 1935 |
| 2,024,742 | Parsons | Dec. 17, 1935 |
| 2,171,512 | Crout | Aug. 29, 1939 |
| 2,181,152 | Rolf | Nov. 28, 1939 |
| 2,236,162 | Von Henke | Mar. 25, 1941 |
| 2,394,060 | Holmes | Feb. 5, 1946 |
| 2,604,519 | Mackereth | July 22, 1952 |
| 2,615,075 | Paluev | Oct. 21, 1952 |
| 2,619,521 | Cuttino | Nov. 25, 1952 |